United States Patent [19]

Chambon et al.

[11] Patent Number: 5,204,453
[45] Date of Patent: Apr. 20, 1993

[54] PROCESS FOR THE PREPARATION OF 1:2 METAL COMPLEX AZO COMPOUNDS BY CARRYING OUT DIAZOTIZATION AND COUPLING IN THE PRESENCE OF A METAL DONOR

[75] Inventors: Bernard Chambon, Michelbach Le Haut, France; Horst H. Jäger, Bettingen, Switzerland; Rüdiger Oxenius, Rheinfelden, Fed. Rep. of Germany; Alois Püntener, Rheinfelden, Switzerland

[73] Assignee: Ciba-Geigy Corporation, Ardsley, N.Y.

[21] Appl. No.: 815,839

[22] Filed: Dec. 30, 1991

Related U.S. Application Data

[63] Continuation of Ser. No. 617,486, Nov. 21, 1990, abandoned, which is a continuation of Ser. No. 25,469, Mar. 13, 1987, abandoned.

[30] Foreign Application Priority Data

Mar. 18, 1986 [CH] Switzerland .......................... 1087/86
Jul. 30, 1986 [CH] Switzerland .......................... 3061/86

[51] Int. Cl.$^5$ ...................... C09B 41/00; C09B 45/01
[52] U.S. Cl. ................................... 534/602; 534/581; 534/582; 534/693; 534/700; 534/711; 534/712; 534/723; 534/721; 534/706
[58] Field of Search .......................... 534/602

[56] References Cited

U.S. PATENT DOCUMENTS

| | | | |
|---|---|---|---|
| 1,480,640 | 1/1924 | Straub et al. | 534/696 |
| 3,185,676 | 5/1965 | Klein | 534/602 |
| 3,869,439 | 3/1975 | Schundehutte | 534/652 X |
| 4,469,485 | 9/1984 | Grossmann | 534/602 X |

FOREIGN PATENT DOCUMENTS

| | | | |
|---|---|---|---|
| 0019152 | 11/1980 | European Pat. Off. | 534/602 |
| 0077965 | 4/1983 | European Pat. Off. | 534/602 |
| 0098965 | 1/1984 | European Pat. Off. | 534/602 |
| 0103165 | 3/1984 | European Pat. Off. | 534/602 |
| 0088271 | 10/1984 | European Pat. Off. | 534/602 |
| 493895 | 2/1930 | Fed. Rep. of Germany . | |
| 350697 | 7/1930 | Fed. Rep. of Germany | 534/602 |
| 883109 | 11/1981 | U.S.S.R. | 534/602 |
| 994522 | 2/1983 | U.S.S.R. | 534/602 |
| 2129434 | 5/1984 | United Kingdom | 534/602 |

OTHER PUBLICATIONS

Schetty, J. Soc. Dyers Colourists, vol. 71 (1955), pp. 705-724.
F. Beffa et al. Review of Progress in Coloration and Related Topics, 14, 33-42 (1984).
M. Peter, Grundlogen der Fertilveredlung pp. 194-195.
CA 99:106773p Hirsch et al. (1983).
CA 87:137306 Kawasaki et al. II (1977).
CA 87:119238u Kawasaki et al. (1977).

*Primary Examiner*—Mary C. Lee
*Assistant Examiner*—Fiona T. Powers
*Attorney, Agent, or Firm*—Marla J. Mathias; Edward McC. Roberts

[57] ABSTRACT

The invention relates to a process for the preparation of 1:2 chromium, 1:2 cobalt, 1:2 nickel or 1:2 iron complex azo dyes diazotisation, coupling and metallizing, without isolation of the coupling product, which process comprises diazotizing at least one amine of the benzene or naphthalene series in aqueous solution and coupling the diazonium compound so obtained to at least one coupling component of the benzene or naphthalene series or of the heterocyclic series, such that the azo dye obtained as intermediate contains groups suitable for metal complex formation, and carrying out the diazotization or coupling in the presence of a chromium, cobalt, nickel or iron donor.

The dyes obtained by the process of the invention are suitable for dyeing in particular wool or synthetic textile polyamide fibre materials as well as leather, and for use as wood mordant dyes.

19 Claims, No Drawings

PROCESS FOR THE PREPARATION OF 1:2 METAL COMPLEX AZO COMPOUNDS BY CARRYING OUT DIAZOTIZATION AND COUPLING IN THE PRESENCE OF A METAL DONOR

This application is a continuation of application Ser. No. 617,486, filed Nov. 21, 1990, now abandoned, which in turn is a continuation of application Ser. No. 025,469, filed Mar. 13, 1987, now abandoned.

The present invention relates to a novel process for the preparation of symmetrical or mixed 1:2 metal complex azo dyes by diazotisation, coupling and metallising, without isolation of the coupling product, by carrying out the diazotisation or coupling in the presence of a metal donor.

The method conventionally employed hitherto for obtaining symmetrical 1:2 metal complex azo dyes which contain, per metal atom, two identical azo ligands, or mixed 1:2 metal complex azo dyes which consist of at least two symmetrical complexes and at least one asymmetrical complex, comprises e.g. the following steps:

diazotising at low temperature an amine which contains a group suitable for metal complex formation;
coupling the diazonium salt, normally at low temperature, to a coupling component which contains a group suitable for metal complex formation;
isolating the coupling product by salting out and filtration;
dissolving or suspending the coupling product;
metallising the coupling product; and
isolating the 1:2 metal complex azo dye.

The shortcomings of this procedure are e.g. the following time-consuming and expensive steps:
isolating the coupling product, e.g. by salting out and filtration;
dissolving the coupling product again, if necessary or desired with heating for the metallising step.

Also known are processes for the preparation of symmetrical or mixed 1:2 metal complex azo dyes, without isolation of the coupling product, by carrying out the coupling reaction and the metallising in organic solvents, especially aqueous organic, water-miscible solvents.

The drawback of this process is the necessity of removing the organic solvent and the complicated separation of dye, water and organic solvent.

An additional drawback of this known process is the greater wastewater pollution compared with the pure aqueous procedure.

Surprisingly, there has now been found a novel process which does not have the disadvantages referred to above and by means of which it is possible to prepare 1:2 metal complex azo dyes in simple manner.

Accordingly, the present invention relates to a process for the preparation of 1:2 chromium, 1:2 cobalt, 1:2 nickel or 1:2 iron complex azo dyes by diazotisation, coupling and metallising, without isolation of the coupling product, which process comprises diazotising at least one amine of the benzene or naphthalene series in aqueous solution and coupling the diazonium salt so obtained to at least one coupling component of the benzene or naphthalene series or of the heterocyclic series, such that the azo dye obtained as intermediate contains groups suitable for metal complex formation, and carrying out the diazotisation or coupling in the presence of a chromium, cobalt, nickel or iron donor.

In the process of this invention, it is surprising that the complicated isolation of the coupling product can be dispensed with;
diazotisation, coupling and metallising are carried out utilising a single vessel for all three steps;
the reaction time is shortened by a higher coupling temperature and immediate metallising is possible;
the reactions are carried out in concentrated solution.

Sensitive azo compounds can also be obtained by the process of this invention, as the azo intermediate can be stabilised even in the acid pH range directly after coupling by forming a complex with the metal present in the reaction mass.

In the process of this invention, diazotisation or coupling is carried out in the presence of a chromium, cobalt, nickel or iron donor. During diazotisation in the presence of the metal donor, the metal donor is a component of the solution of the diazonium salt and thus present during diazotisation and coupling, whereas coupling in the presence of the metal donor means that the metal donor is a component of the solution of the coupling component.

A preferred embodiment of the process of this invention comprises diazotising, in aqueous solution, at least one amine of the benzene or naphthalene series which contains a group suitable for metal complex formation, and coupling the diazonium salt to at least one coupling component of the benzene or naphthalene series or of the heterocyclic series, which coupling component contains a group suitable for metal complex formation, the diazotisation or the coupling being carried out in the presence of a chromium, cobalt, nickel or iron donor.

A further preferred embodiment of the process of this invention comprises carrying out diazotisation or coupling in the presence of a chromium, cobalt or nickel donor.

In yet a further preferred embodiment of the process of this invention, the aqueous solution of the coupling component contains the chromium, cobalt, nickel or iron donor.

It is most preferred to use a chromium or cobalt donor in the process of this invention.

The coupling of at least one diazonium salt to at least one coupling component is normally effected in the temperature range above 0° C., e.g. in the range from 0° to 100° C. Coupling is conveniently carried out in the temperature range from 40° to 100° C., preferably from 55° to 85° C. and, most preferably, from 70° to 80° C. The initial temperature of the coupling reaction is in the range from 0° to 100° C., preferably from 40° to 60° C.

As the coupling can be carried out in the acid as well as in the alkaline pH range, the pH can vary within a wide range. A pH range from 0.5 to 11 has proved generally satisfactory.

Metallising is normally carried out in the temperature range from 40° to 160° C., preferably from 60° to 120° C. and, most preferably from 75° to 100° C. In the temperature range above 100° C., metallising is carried out in a closed vessel under pressure (excess pressure). A pressure of 1 to 6 bar, preferably of 2 to 4 bar, has proved useful.

Metallising is carried out normally in a pH range from 2 to 12.

The process of this invention is carried out in aqueous solution without the addition of an organic solvent. In addition to containing the compounds necessary for diazotisation and metallising, e.g. sodium nitrite and cobalt sulfate, iron(III) chloride, sodium chromate salicylate or nickel sulfate, the aqueous solution may contain further salts, such as alkali metal or alkaline earth metal salts, e.g. $Na_2SO_4$, $MgCl_2$ or NaCl, or the salts of carboxylic acids such as sodium acetate, sodium tartrate, sodium chromate salicylate, which are used direct as salts or in the form of the free acid which is partly or wholly neutralised during metallising, and compounds that influence the solution or suspension, e.g. antifoams.

The diazotisation of at least one amine is effected in a manner which is known per se by converting the amine into the diazonium salt with a diazotising agent, e.g. sodium nitrite, in acid solution, e.g. at pH 0.1 to 2, and in the temperature range from $-10°$ to $+70°$ C., optionally under adiabatic conditions.

The amines and coupling components employed in the process of the invention contain groups suitable for metal complex formation such that either the diazo component or, preferably, the coupling component contains two groups suitable for metal complex formation, one of which groups e.g. is able to form a covalent bond and the other a coordinative bond, or such that the diazo component as well as the coupling component each contain a group suitable for metal complex formation, usually to form covalent bonds.

The amines employed in the process of this invention and which are substituted by a group suitable for metal complex formation, contain said group preferably in ortho-position to the amine group, whereas the coupling components, which are substituted by a group suitable for metal complex formation, contain said group preferably adjacent to the coupling site.

Examples of groups suitable for metal complex formation are: the hydroxyl, carboxyl, methoxy or amino group, as well as mono($C_1$–$C_4$)alkylamino which is substituted by hydroxy, $C_1$–$C_4$alkoxy or halogen, or phenylamino.

Further groups which are suitable for metal complex formation are those that are able to form a coordinative bond, e.g. hetero atoms present in a heterocyclic aromatic ring, e.g. the nitrogen atom in quinoline.

The amines of the benzene or naphthalene series eligible for use in the process of this invention can carry the customary substituents of azo dyes.

Representative examples of such substituents are: $C_1$–$C_4$alkyl, e.g. methyl, ethyl, propyl, isopropyl, n-butyl, sec-butyl, isobutyl, tert-butyl; $C_1$–$C_4$alkoxy such as methoxy, ethoxy, propoxy, isopropoxy, n-butoxy, sec-butoxy, isobutoxy, tert-butoxy; halogen, e.g. fluorine, chlorine or bromine; nitro, cyano, trifluoromethyl, —$SO_2NH_2$, N—($C_1$–$C_4$)alkylsulfamoyl, e.g. N-methylsulfamoyl, N—($C_1$–$C_4$)—alkoxy-($C_1$–$C_4$)alkylsulfamoyl such as N—($\beta$-methoxyethyl)sulfamoyl, phenylsulfamoyl, carboxyphenylsulfamoyl, $C_1$–$C_4$alkylsulfonyl such as methylsulfonyl, $C_2$–$C_5$alkanoylamino such as acetylamino, propionylamino, benzoylamino, benzylsulfone, $C_1$–$C_4$hydroxyalkylsulfonyl, N—($C_1$–$C_4$)hydroxyalkylsulfamoyl, and sulfo.

It is preferred to use amines that contain a metallisable group in ortho-position to the amino group.

Examples of suitable amines are: 2-amino-1-hydroxybenzene, 2-amino-1-methoxybenzene, anthranilic acid, 4- or 5-sulfonamidoanthranilic acid, 3- or 5-chloranthranilic acid, 4-chloro- and 4,6-dichloro-2-amino-1-hydroxybenzene, 4- or 5- or 6-nitro-2-amino-1-hydroxybenzene, 4-chloro- and 4-methyl- and 4-acetylamino-6-nitro-2-amino-1-hydroxybenzene, 6-acetylamino- and 6-chloro-4-nitro-2-amino-1-hydroxybenzene, 4-cyano-2-amino-1-hydroxybenzene, 4-methoxy-2-amino-1-hydroxybenzene, 2-amino-1-hydroxybenzene-5-methyl- and -5-benzylsulfone, 2-amino-1-hydroxybenzene-4-methyl-, -ethyl-, -chloromethyl- and -butylsulfone, 6-chloro-, 5-nitro- and 6-nitro-2-amino-1-hydroxybenzene-4-methylsulfone, 2-amino-1-hydroxybenzene-4- or -5-sulfamide, 2-amino-1-hydroxybenzene-4- or -5-sulf-N-methylamide and 2-amino-1-hydroxybenzene-4-or -5-sulf-N-$\beta$-hydroxyethylamide, 2-amino-1-methoxybenzene-4-sulfanilide, 4-methoxy-5-chloro-2-amino-1-hydroxybenzene, 4-methyl-2-amino-1-hydroxybenzene, 4-chloro-5-nitro-2-amino-1-hydroxybenzene, 5-nitro-4-methyl-2-amino-1-hydroxybenzene, 5-nitro-4-methoxy-2-amino-1-hydroxybenzene, 3,4,6-trichloro-2-amino-1-hydroxybenzene, 6-acetylamino-4-chloro-2-amino-1-hydroxybenzene, 4,6-dinitro-2-amino-1-hydroxybenzene, 4-nitro-2-amino-1-hydroxybenzene-5-or -6-sulfonamide, 4- or 5-chloroanisidine, 4- or 5-nitroanisidine, 2-methoxy-5-methylaniline, 2,5-dimethoxyaniline, 2-anisidine-4- or -5-$\beta$-hydroxyethylsulfone, 4-methyl-6-sulfo-2-amino-1-hydroxybenzene, 2-amino-4-sulfo-1-hydroxybenzene, 4-chloro-6-sulfo-2-amino-1-hydroxybenzene, 6-chloro-4-sulfo-2-amino-1-hydroxybenzene, 5-nitro-4-sulfo-2-amino-1-hydroxybenzene, 4-nitro-6-sulfo-2-amino-1-hydroxybenzene, 6-nitro-4-sulfo-2-amino-1-hydroxybenzene, 4-acetylamino-2-amino-1-hydroxybenzene, 4-acetylamino-6-sulfo-2-amino-1-hydroxybenzene, 5-acetylamino-2-amino-1-hydroxybenzene, 6-acetylamino-4-sulfo-2-amino-1-hydroxybenzene, 4-chloro-2-amino-1-hydroxybenzene-5-sulfamide, 2-amino-1-hydroxybenzene-4-(N-2'-carboxyphenyl)sulfamide, 1-amino-2-hydroxy-4-sulfonaphthalene, 1-amino-2-hydroxy-4-sulfo-6-nitronaphthalene, 1-amino-2-hydroxy-4-sulfo-6-acetamidonaphthalene, 1-amino-2-hydroxy-4,8-disulfonaphthalene, 1-amino-2-hydroxy-6-sulfonaphthalene, 1-amino-2-hydroxy-7-sulfonaphthalene, 1-amino-2-hydroxy-8-sulfonaphthalene, 2-amino-1-hydroxy-4-sulfonaphthalene, 2-amino-1-hydroxy-6-sulfonaphthalene, 2-amino-1-hydroxy-6-sulfo-4-nitrobenzene.

Further amines that do not contain a metallisable group are e.g.:
2-amino-1,1'-diphenylsulfone, 2-amino-4-chloro-1-phenyl-2'-naphthylsulfone, 2-amino-4'-methyl-1,1'-diphenylsulfone, 2-amino-4'-chloro-1,1'-diphenylsulfone, 2-amino-1-phenyl-2'-naphthylsulfone, 4-amino-4'-chloro-1,1'-diphenylsulfone, 4-amino-1,1'-diphenylsulfone, aniline-4-sulfamide, aniline-4-N-methylsulfamide, anilin-4-N-ethylsulfamide, aniline-2-N-methyl-N-$\beta$-hydroxyethylsulfamide, aniline-4-N-methyl-N-$\beta$-hydroxyethylsulfamide, aniline-4-N,N-dimethylsulfamide, aniline-4-N-phenylsulfamide, 2-chloro-5-(4'-methylphenylcarbonyl)-aniline, 2-amino-1-phenyl-2'-naphthylsulfone-4-sulfamide, aniline-2-N-ethyl-N-phenylsulfamide, 2-chloro-5(4'-chlorophenylcarbonyl)-aniline, anilin-4-N(2'-methylphenyl)sulfamide, anilin-4-N(2'-chlorophenyl)sulfamide, anilin-4-N-(3'-trifluoromethylphenyl)sulfamide, anilin-2-N-methyl-N-cyclohexylsulfamide, 4-methylaniline-3-N-phenylsulfamide, 4-methylaniline-3-N-ethyl-N-phenylsulfamide, 2-trifluoromethyl-4-acetyaminoaniline, 2-chloroaniline, 2-methoxy-5-chloroaniline, aniline, 2-ethoxyaniline, 2-(2'-chlorophenoxy)-5-chloroaniline, aniline-3-N-ethyl-N-phenylsulfamide, 2,4-di(o-methylphenoxy)aniline, 2-phenoxyaniline-5-N-ethyl-N-phenylsulfamide, 2-(2'-methylphenoxy)aniline, 2-methoxyaniline-5-sulfamide, 2-phenoxyaniline, 2-phenoxy-5-chloroaniline, 2,3- or 3,4- or 2,4- or 2,5- or 3,5- or 2,6-dichloroaniline, 2-(2'-chlorophenoxysulfonyl)-5-methylaniline, 2- , 3- or 4-sulfoaniline.

The coupling components can be derived for example from the following groups of coupling components:

Naphthols which couple in the ortho-position to the —OH group and are unsubstituted or substituted by halogen, e.g. chlorine, amino, acylamino, e.g. $C_2-C_5$-alkanoylamino, benzoylamino, acyl, e.g. $C_2-C_5$-alkanoyl, benzoyl, $C_1-C_4$alkyl, $C_1-C_4$alkoxy, sulfamoyl, N-monosubstituted or N,N-disubstituted sulfamoyl groups, sulfo and sulfone groups.

Naphthylamines which couple in the ortho-position to the amino group and are unsubstituted or substituted by halogen, preferably bromine, $C_1-C_4$alkyl, $C_1-C_4$alkoxy, sulfamoyl, monosubstituted or disubstituted sulfamoyl, sulfo or sulfone groups.

5-Pyrazolones which carry in 1-position a phenyl or naphthyl radical which is unsubstituted or substituted by chlorine, or nitro, $C_1-C_4$alkyl and $C_1-C_4$alkoxy groups, sulfonamido, N-alkylated sulfamoyl groups, sulfo or sulfone groups, and, in particular, by amino groups.

2,6-Dihydroxy-3-cyano- or 3-carbamoyl-4-alkylpyridines and 6-hydroxy-2-pyridones which are substituted in the 1-position by unsubstituted or substituted $C_1-C_4$alkyl, for example methyl, isopropyl, $\beta$-hydroxyethyl, $\beta$-aminoethyl, $\gamma$-isopropoxypropyl or by —NH$_2$, or by a substituted amino group such as dimethylamino or diethylamino, and which carry in the 3-position a cyano or carbamoyl group and, in the 4-position, a $C_1-C_4$alkyl group, preferably a methyl group.

Acetoacetanilides, acetoacetnaphthylamides and benzoylacetanilides which may be substituted in the anilide nucleus by $C_1-C_4$alkyl, $C_1-C_4$alkoxy or $C_1-C_4$alkylsulfonyl groups, $C_1-C_4$hydroxyalkyl, $C_1-C_4$-alkoxy-$C_1-C_4$-alkyl or $C_1-C_4$-cyanoalkylsulfonyl groups, sulfamoyl groups, N-alkylated sulfamoyl groups, sulfo, acetylamino and halogen.

Phenols which are substituted by low molecular acylamino groups and/or $C_1-C_5$alkyl groups and which couple in the ortho-position.

Quinolines which are substituted by 1 or 2 hydroxy groups.

Examples of such coupling components are: 2-naphthol, 1-naphthol, 1-hydroxynaphthalene-4- or 5-sulfonic acid, 1,3- or 1,5-dihydroxynaphthalene, 1-hydroxy-7-aminonaphthalene-3-sulfonic acid, 2-naphthol-6-sulfonic acid, 1-hydroxy-7-N-methyl- or N-acetylaminonaphthalene-3-sulfonic acid, 2-naphthol-6-$\beta$-hydroxyethylsulfone, 1-hydroxy-6-amino- or -6-N-methyl- or -6-N-acetylaminonaphthalene-3-sulfonic acid, 1-hydroxy-7-aminonaphthalene-3,6-disulfonic acid, 1-hydroxy-6-aminonaphthalene-3,5-disulfonic acid, 1-acetylamino-7-naphthol, 1-hydroxy-6-N-(4'-aminophenyl)aminonaphthalene-3-sulfonic acid, 1-hydroxy-5-aminonaphthalene-3-sulfonic acid, 1-propionylamino-7-naphthol, 2-hydroxy-6-aminonaphthalene-4-sulfonic acid, 1-carbomethoxyamino-7-naphthol, 1-hydroxy-8-aminonaphthalene-5-sulfonic acid, 1-carboethoxy-amino-7-naphthol, 1-hydroxy-8-aminonaphthalene-5,7-disulfonic acid, 1-carbopropoxyamino-7-naphthol, 1-hydroxy-8-aminonaphthalene-3-sulfonic acid, 1-dimethylaminosulfonylamino-7-naphthol, 6-acetylamino-2-naphthol, 1-hydroxy-8-aminonaphthalene-3,5- or 3,6-disulfonic acid, 4-acetylamino-2-naphthol, 2-hydroxy-5-aminonaphthalene-4,7-disulfonic acid, 4-methoxy-1-naphthol, 4-acetylamino-1-naphthol, 1-naphthol-3, -4- or -5-sulfonamide, 2-naphthol-3-, -4-, -5-, -6-, -7- or -8-sulfonamide, 5,8-dichloro-1-naphthol, 5-chdloro-1-naphthol, 2-naphthylamine, 2-naphthylamine-1-sulfonic acid, 2-aminonaphthalene-5-, -6- or -7-sulfonamide, 2-amino-6-N-(methyl, ethyl, isopropyl, $\beta$-oxyethyl or $\gamma$-methoxypropyl)naphthalene-6-sulfonamide, 2-aminonaphthalene-6-sulfanilide, 2-aminonaphthalene-6-N-methylsulfonanilide, 1-aminonaphthalene-3-, -4- or -5-sulfonamide, 1-aminonaphthalene-5-methyl- or -ethylsulfone, 5,8-dichloro-1-aminonaphthalene, 2-phenylaminonaphthalene, 2-N-methylaminonaphthalene, 2-N-ethylaminonaphthalene, 2-phenylaminonaphthalene-5-, -6- or -7-sulfonamide, 2-(3'-chlorophenylamino)naphthalene-5-, -6- or -7-sulfonamide, 6-methyl-2-aminonaphthalene, 6-bromo-2-aminonaphthalene, 6-methoxy-2-aminonaphthalene, 1,3-dimethylpyrazolone, 3-methyl-5-pyrazolone, 1-phenyl-3-methyl-5-pyrazolone, 1-phenyl-3-carbonamido-5-pyrazolone, 1-(2'-, 3'- or 4'-methylphenyl)-3-methyl-5-pyrazolone, 1-[3'- or 4'-($\beta$-hydroxyethylsulfonyl)phenyl]-3-methyl-5-pyrazolone, 1-(2'-methoxyphenyl)-3-methyl-5-pyrazolone, 1-(2'-, 3'- or 4'-chlorophenyl)-3-methyl-5-pyrazolone, 1-(2'-, 3'- or 4'-nitrophenyl)-3-methyl-5-pyrazolone, 1-(2', 5'- or 3',4'-dichlorophenyl)-3-methyl-5-pyrazolone, 1-(2', 3'- or 4'-sulfamoylphenyl)-3-methyl-5-pyrazolone, 1-(2'-, 3'- or 4'-methylsulfonylphenyl)-3-methyl-5-pyrazolone, 2,6-dihydroxy-3-cyano-4-methylpyridine, 1-methyl-3-cyano-4-ethyl-6-hydroxypyrid-2-one, 1-amino-3-cyano-4-methyl-6-hydroxypyrid-2-one, 1-phenyl-3-carbonamido-4-methyl-6-hydroxypyrid-2-one, acetoacetanilide, acetoacet-o-, -m- or -p-sulfoanilide, acetoacet-4-($\beta$-hydroxyethylsulfonyl)anilide, acetoacet-o-anisidide, acetoacetnaphthylamide, acetoacet-o-toluidide, acetoacet-o-chloroanilide, acetoacet-m- or -p-chloroanilide, acetoacetanilide-3- or -4-sulfonamide, acetoacet-3- or -4-aminoanilide, acetoacet-m-xylidide, benzoylacetanilide, 4-methylphenol, 3-dialkylaminophenol, in particular 3-dimethylamino-and 3-diethylaminophenol, 4-t-butylphenol, 4-t-amylphenol, 2- or 3-acetylamino-4-methylphenol, 2-methoxycarbonylamino-4-methylphenol, 2-ethoxycarbonylamino-4-methylphenol, 3,4-dimethylphenol and 2,4-dimethylphenol, 1-(4'-aminophenyl)-3-methyl-5-pyrazolone, 1-(2'-, 3'- or 4'-sulfophenyl)-3-methyl-5-pyrazolone, 1-(2'-chloro-4'- or 5'-sulfophenyl)-3-methyl-5-pyrazolone, 1-(2'-methyl-6'-chlorophenyl)-3-methyl-5-pyrazolone, 1-(2'-methyl-4'-sulfophenyl)-3-methyl-5-pyrazolone, 1-(2'-, 3'- or 4'-chloro- or methyl- or sulfophenyl)-3-carboxy-5-pyrazolone, 1-[5'-sulfonaphth-2-yl]-3-methyl-5-pyrazolone, 1-[4"-amino-2', 2"-disulfo-4'-stilbene]-3-methyl-5-pyrazolone, 1-ethyl-3-cyano-4-methyl-6-hydroxypyrid-2-one, 1-ethyl-3-sulfomethyl-4-methyl-6-hydroxypyrid-2-one, 2,6-dihydroxy-3-cyano-4-sulfomethylpyridine, 2,4,6-trihydroxypyrimidine.

A further coupling component that contains two groups suitable for metal complex formation and which are not attached to the coupling component adjacent to the coupling site is e.g. 8-hydroxyquinoline.

Examples of suitable chromium, cobalt, nickel or iron donors are the customary salts or complex compounds of these metals, for example chromium(III) chloride, chromium(III) fluoride, chromium(III) acetate, Cr(OH)SO$_4$, chromium(III) formate, cobalt(II) sulfate, cobalt(II) acetate, cobalt tartrate, freshly precipitated cobalt(II) hydroxide, nickel sulfate, iron(III) chloride; as well as complex iron and chromium compounds, aliphatic dicarboxylic acids, hydroxycarboxylic acids or aromatic hydroxycarboxylic acids, e.g. sodium chromate salicylate.

A preferred embodiment of the process of this invention for the preparation of symmetrical 1:2 metal complex azo dyes of formula

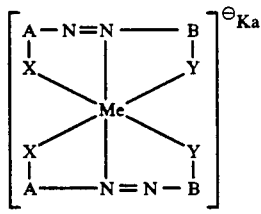

wherein each A is the identical radical of a diazo component of the benzene or naphthalene series, each B is the identical radical of a coupling component of the benzene or naphthalene series or of the heterocyclic series, each X is —O— or —COO—, each Y is —O— or —N(R)—, where R is hydrogen, $C_1$-$C_4$alkyl or phenyl, Me is chromium, cobalt or iron, preferably chromium or cobalt, and Ka is a cation, and X and Y are attached to A and B adjacent to the azo group, comprises diazotising an amine of formula

and coupling the diazonium salt to a coupling component of formula

the solution of which coupling component contains the chromium, cobalt or iron donor, preferably the chromium or cobalt donor, in which formulae (2) and (3) above A, B, X and Y are as defined for formula (1).

Another preferred embodiment of the process of this invention for the preparation of mixed 1:2 metal complex azo dyes consisting of at least two symmetrical 1:2 chromium, 1:2 cobalt or 1:2 iron complexes and at least one asymmetrical 1:2 chromium, 1:2 cobalt or 1:2 iron complex, comprises coupling at least one amine of formula (2) to at least one coupling component of formula (3), the solution of which coupling component or components contains the chromium, cobalt or iron donor, with the proviso that at least two amines of formula (2) or at least two coupling components of formula (3) are used. The preparation of 1:2 chromium or 1:2 cobalt complexes is preferred. In both the above preferred embodiments of the process of the invention, it is advantageous to use an amine of formula (2) in which A is a radical of the benzene or naphthalene series which may be substituted by $C_1$-$C_4$alkyl, $C_1$-$C_4$alkoxy, halogen, nitro, sulfamoyl, N—($C_1$-$C_4$)alkylsulfamoyl, N—($C_1$-$C_4$)alkoxy-($C_1$-$C_4$)alkylsulfamoyl, phenylsulfamoyl, carboxyphenylsulfamoyl, $C_1$-$C_4$-alkylsulfonyl, $C_2$-$C_5$alkanoylamino, cyano, trifluoromethyl and sulfo.

The preferred coupling component of formula (3) is acetoacetanilide, 1-phenyl-3-methyl-5-pyrazolone, 1- or 2-naphthol or 2-naphthylamine, which may be substituted by halogen, $C_1$-$C_4$alkyl, cyano, sulfamoyl, $C_2$-$C_5$alkanoylamino, $C_2$-$C_5$alkoxycarbamoyl, $C_1$-$C_4$alkylsulfamoyl, $C_1$-$C_4$alkoxy, sulfo, hydroxy, phenyl or —$SO_2$—$CH_2$—O—. Phenol which may be substituted by $C_1$-$C_5$alkyl can also be used as coupling component of formula (3).

A further preferred embodiment of the process of this invention for the preparation of symmetrical 1:2 chromium or 1:2 cobalt complex azo dyes comprises diazotising an amine of the benzene or naphthalene series which can be further substituted by the substituents indicated above, and coupling the diazonium salt to a heterocyclic coupling component that contains two groups suitable for metal complex formation. In this embodiment of the process, it is especially preferred to use an amine of the benzene series, preferably an anilinesulfonic acid and, as coupling component, 8-hydroxyquinoline. It is most preferred to use a cobalt donor as metal donor in this embodiment of the process of the invention.

An important embodiment of the process of the invention comprises preparing the dyes of the following formulae:

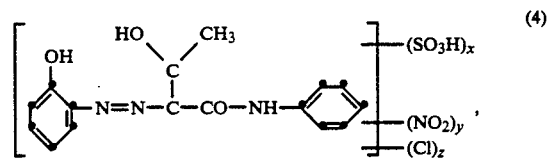

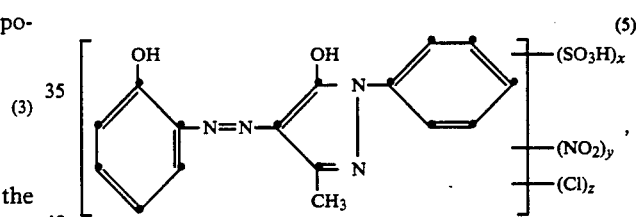

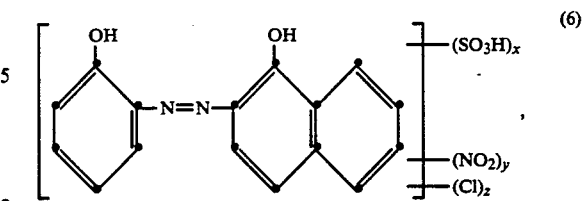

in which formulae (4) to (6) above x is 1 or 2, preferably 1, y is 0, 1 or 2, preferably 1, and z is 0, 1 or 2, preferably 0 or 1.

A particularly preferred embodiment of the process of this invention comprises preparing dyes of the following formulae:

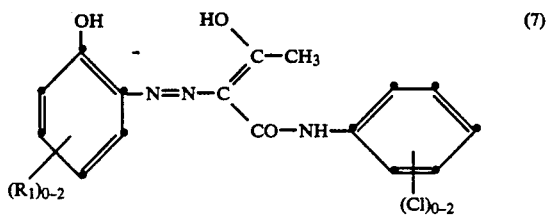

1:2 cobalt complex wherein $(R_1)_{0-2}$ denotes 0 to 2 substituents $R_1$ which may be each independently of the other $C_1-C_4$alkyl, $C_1-C_4$alkoxy, halogen, nitro, sulfamoyl, sulfo, N—($C_1-C_4$)alkylsulfamoyl, N—($C_1-C_2$)alkoxy-($C_1-C_2$)alkylsulfamoyl, phenylsulfamoyl, carboxyphenylsulfamoyl, $C_1-C_4$alkylsulfonyl or acetylamino;

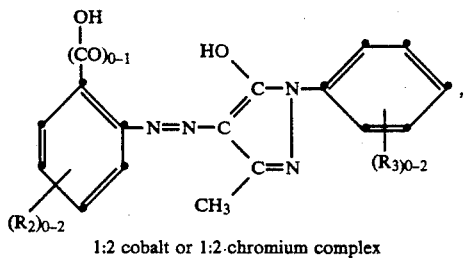

1:2 cobalt or 1:2 chromium complex wherein $(R_2)_{0-2}$ denotes 0 to 2 substituents $R_2$ which may be each independently of the other $C_1-C_4$-alkyl, $C_1-C_4$alkoxy, halogen, nitro, sulfamoyl, sulfo, N—($C_1-C_4$)alkylsulfamoyl, N—($C_1-C_2$)alkoxy-($C_1-C_3$)alkylsulfamoyl, phenylsulfamoyl, carboxyphenylsulfamoyl, $C_1-C_4$alkylsulfonyl, or acetylamino, and $(R_3)_{0-2}$ denotes 0 or 2 substituents $R_3$ which may be each independently of the other halogen, $C_1-C_4$alkyl, cyano, sulfo or sulfamoyl;

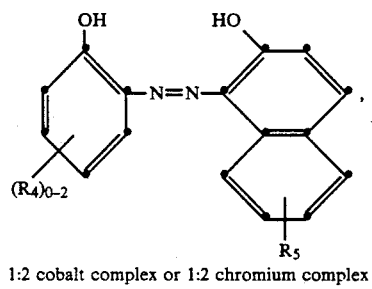

1:2 cobalt complex or 1:2 chromium complex wherein $R_4$ has the same meaning as $R_1$ in formula (7), and $R_5$ is hydrogen, acetylamino, methoxycarbamoyl or methylsulfamoyl;

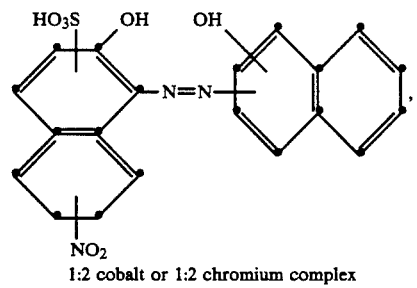

1:2 cobalt or 1:2 chromium complex

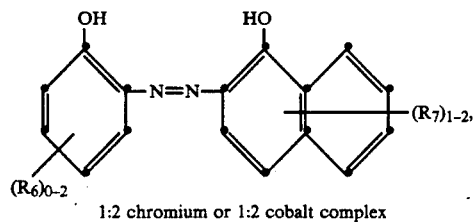

1:2 chromium or 1:2 cobalt complex wherein $R_6$ has the same meaning as $R_1$ in formula (7) and $(R_7)_{1-2}$ denotes 1 or 2 substituents $R_7$ which may be each independently of the other halogen, methyl, methoxy or sulfo, or wherein 2 adjacent substituents $R_7$ are able to form a closed bridge —$SO_2CH_2$—O—;

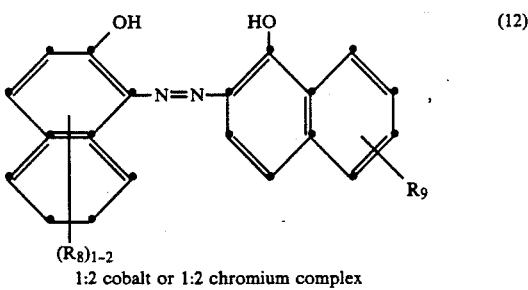

1:2 cobalt or 1:2 chromium complex wherein $(R_8)_{1-2}$ denotes 1 or 2 substituents $R_8$ which may be each independently of the other sulfo or nitro, and $R_9$ is nitrogen or hydroxy;

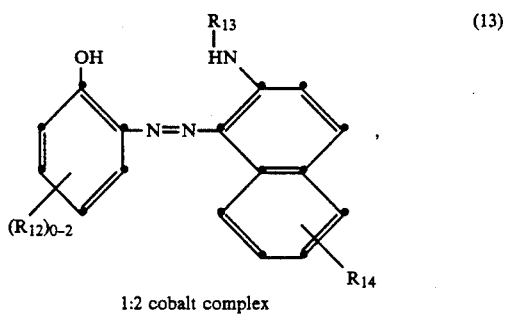

1:2 cobalt complex wherein $R_{12}$ has the same meaning as $R_1$ in formula (7), $R_{13}$ is hydrogen or phenyl, and $R_{14}$ is hydrogen or sulfo;

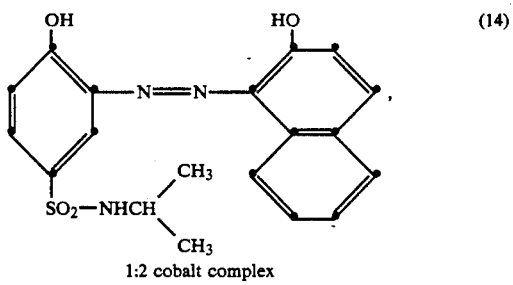

1:2 cobalt complex

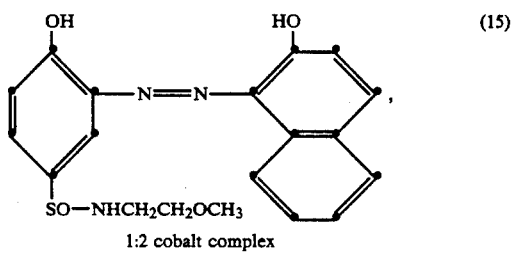

1:2 cobalt complex

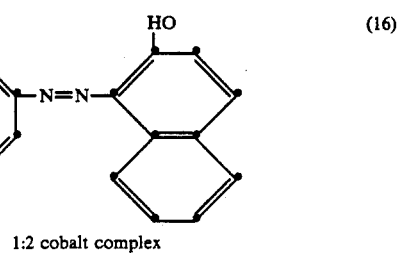

1:2 cobalt complex

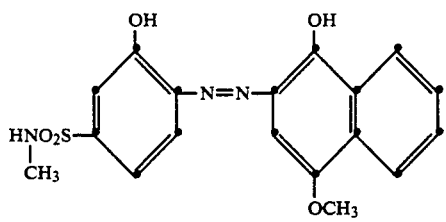

1:2 chromium complex (17)

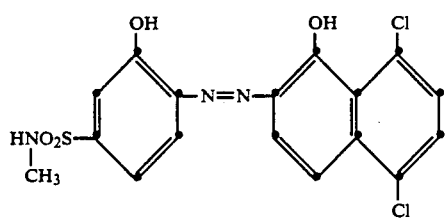

1:2 chromium complex (18)

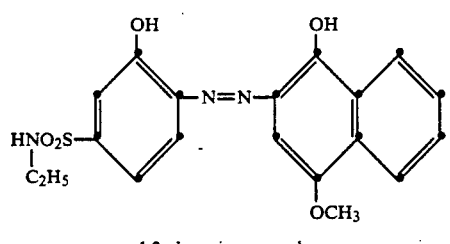

1:2 chromium complex (19)

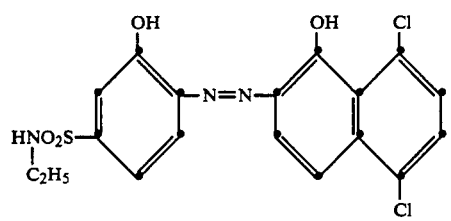

1:2 chromium complex (20)

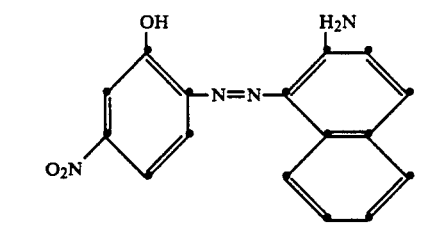

1:2 cobalt complex (21)

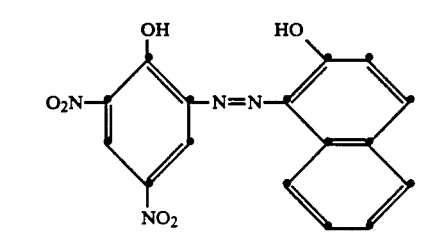

1:2 chromium complex (22)

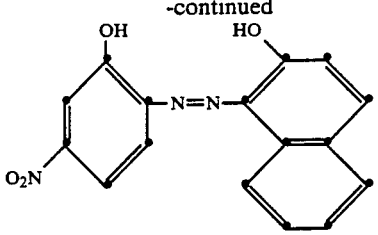

1:2 chromium complex (23)

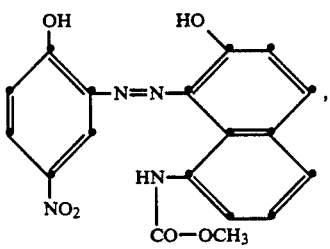

1:2 chromium complex (24)

The preparation of the dyes of formulae (7) to (24) by diazotising an amine and coupling the diazonium salt to a coupling component in the presence of a chromium or cobalt donor corresponds to the preparation as described above for diazotising, coupling and metallising with the compounds of formulae (2) and (3).

A particularly preferred embodiment of the process of this invention comprises using, as amine of formula (2), at least one 2-amino-5-sulfamoylphenol, 2-amino-5- or 4-nitrophenol, 2-amino-4-nitro-6-sulfophenol, 2-amino-6-methylphenol-4-sulfonic acid, 2-amino-4-methyl-5-nitrophenol, 2-amino-4-chloro-5-nitrophenol, 2-aminobenzoic acid, 2-amino-5-sulfobenzoic acid, 2-amino-6-nitrophenol-4-sulfonic acid, 2-amino-4-chlorophenol-5-sulfamide, 1-amino-2-hydroxy-6-nitronaphthalene-4-sulfonic acid, 1-amino-2-hydroxynaphthalene-4-sulfonic acid, 2-aminophenol-4-β-methoxyethylsulfonamide or 2-aminophenol-4-[2'-carboxyphenyl]sulfonamide and, as a coupling component of formula (3), at least one 2-naphthol, 5,8-dichloro-1-naphthol, 1-(3'-methylphenyl)-3-methyl-5-pyrazolone, 1-phenyl-3-methyl-5-pyrazolone, 1-(2',5'-dichloro- or 3',4'-dichlorophenyl)-3-methyl-5-pyrazolone, 1-(2'-or 3' or 4'-chlorophenyl)-3-methyl-5-pyrazolone, 2-naphthylamine-6-methylsulfonamide, acetoaceto-2'-chloro- or 3'-chloroanilide, 1-(4'-sulfophenyl)-3-methyl-5-pyrazolone, acetoacetanilide, 1-naphthol-3- or -4- or -5-sulfonic acid, 2-naphthylamine-6-sulfonic acid, 4-dimethylethylmethylphenol oder 1-(3'-sulfophenyl)-3-methyl-5-pyrazolone.

A further particularly preferred embodiment of the process of this invention comprises diazotising aniline-3-sulfonic acid and coupling the diazonium salt to 8-hydroxyquinoline, the coupling being carried out in the presence of a cobalt donor.

In the process of this invention, the molar ratio of amine to coupling component or the molar ratio of all amines to the sum of all coupling components is preferably 0.8:1.0 to 1.2:1.0, most preferably 0.9:1.0 to 1.1:1.0.

The molar ratio of the sum of the amines and the sum of the coupling components to the metallising agent is preferably 1.2:1.0 to 2.4:1.0, most preferably 1.6:1.0 to 2:1.

In general, an excess of metallising agent of 1 to 20 percent by weight has proved useful in the process of this invention.

The dyes obtained by the process of the invention are either in the form of the free acid or, preferably, of salts thereof. Examples of suitable salts are the alkali metal salts, alkaline earth metal salts or ammonium salts or the salts of an organic amine. Typical examples of such salts are the sodium, lithium, potassium or ammonium salts or the salt of triethanolamine.

The dyes of this invention can be isolated by methods which are known per se and processed to useful dry dye formulations. Isolation is preferably effected at low temperature by salting out and filtration, or by reverse osmosis or ultrafiltration. The filtered dyes can be dried, if desired after the addition of reducing agents and/or buffers, e.g. after the addition of a mixture of identical parts of mono- or disodium phosphate. Drying is preferably carried out at not too elevated temperature and under reduced pressure. By spray drying the entire reaction mixture it is possible in certain cases to obtain the dry formulations direct, i.e. without intermediate isolation of the dyes.

The 1:2 metal complex azo dyes obtained by the process of this invention are suitable for dyeing and printing different materials, especially for dyeing animal fibres such as silk, leather and, preferably, wool, and also for dyeing synthetic fibres made from polyamides (especially polyamide 6 and polyamide 66), polyurethanes or polyacrylonitrile. They are also suitable for use as wood mordant dyes. They are suitable in particular for dyeing from a weakly alkaline, neutral or weakly acid bath containing preferably acetic acid. The dyeings so obtained are level, very brilliant and have good all-round fastness properties, in particular good light- and wetfastness.

The above textile materials can be in a wide range of presentation, e.g. as fibres, yarn, woven or knitted goods.

In the following Examples, parts are by weight. The relationship between parts by weight and parts by volume is the same as that between grams and cubic centimeters.

EXAMPLE 1

22.5 parts of sodium chloride and 4 parts of magnesium chloride are strewed into a solution of 34.7 parts of 2-amino-5-nitrophenol in 160 parts of water and 22.5 parts of 30% sodium hydroxide solution. Then 56.3 parts of 4N sodium nitrite solution are added and the reaction mixture is made up to 350 parts with water. This solution is added to 108 parts of naphthalene-1-sulfonic acid and 22.5 parts of 33% hydrochloric acid in 200 parts of ice whereupon a viscous suspension of yellow diazonium salt crystals forms.

The temperature of this suspension is kept below 10° C. with ice and after stirring for about 45 minutes, a warm suspension of 50° C. comprising 149.6 parts of 2-aminonaphthalene-6-N-methylsulfonamide, 6 parts of 2-aminonaphthalene-6-sulfonic acid and 16.6 parts of cobalt sulfate, which suspension has been made up to a volume of 300 parts with water, is added to this suspension of the diazonium salt. When the addition is complete, the temperature is 20°–30° C. and the pH 1.5 to 1.7. Immediately after the addition, the batch is heated to c. 75° C. and 67.5 parts of sodium chloride are strewed in and the pH is adjusted to 8 with 30% sodium hydroxide solution. The fine crystalline dye is isolated by filtration and dried at 65° C. It dyes wool in blue shades of good fastness properties.

EXAMPLE 2

40 parts of 33% hydrochloric acid are added at 60° C. to 44.6 parts of 2-aminophenol-5-sulfamide in 80 parts of water. To the resultant fine suspension are added 8 parts of magnesium chloride in 15 parts of water as well as 100 parts of ice and then 56.3 parts of 4N sodium nitrite solution, while keeping the temperature below 10° C. The diazo solution is stirred for about 1 hour, adjusted to pH 3 with 18 parts of 30% sodium hydroxide solution and then 300 parts of ice are added. To the suspension of the diazonium salts is then added, at a temperature below 0° C., a solution containing 50.34 parts of 5,8-dichloro-1-naphthol, 456 parts of a 3% sodium chromate salicylate solution, 38.5 parts of 20% sodium hydroxide solution and 100 parts of ice. When this addition is complete, the pH is adjusted immediately to 12.5 with 30% sodium hydroxide solution and the reaction mixture is stirred for about 2 hours. The pH is adjusted to 9–9.5 with acetic acid and the reaction solution is heated to 100° C. The pH is kept constant at 9.5 with sodium hydroxide solution and the batch is stirred for about 2 hours. The pH is then adjusted to 7 with acetic acid and then 96 parts of sodium chloride are added in portions. The precipitated dye is isolated by filtration and dried at 65° C. The dye of formula

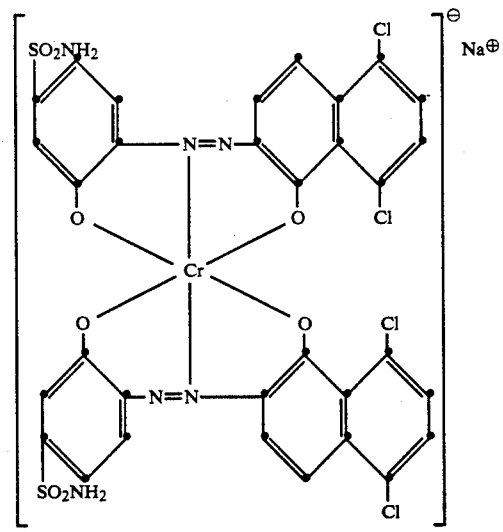

dyes wool in blue shades of good fastness properties.

EXAMPLE 3

31.2 parts of 2-amino-4-chlorophenol-5-sulfamide are well stirred in 140 parts of water and 16.7 parts of 32% hydrochloric acid are added. After addition of 75 parts of ice, the temperature falls to c. 0° C. With efficient stirring, 35 parts of 4N sodium nitrite solution are added and the temperature rises to 20°–25° C. The reaction mixture is stirred for 30 minutes and the resultant suspension of the diazonium salt is added to a warm solution of 50° C. containing 216 parts of 3% sodium chromate salicylate solution, 25.6 parts of 1-phenyl-3-methylpyrazol-5-one and 13.4 parts of 30% sodium hydroxide solution. The batch is heated at once to 80° C. and then to 100° C. after adjusting the pH to 8.5 to 9. The reaction mixture is stirred for 90 minutes at 100° C.

and made up to a volume of 300 parts with water, adjusted to pH 5.0 with 80% acetic acid and stirred for 30 minutes. The dye is salted out with sodium chloride, isolated by filtration and dried at 65° C. The dye of formula

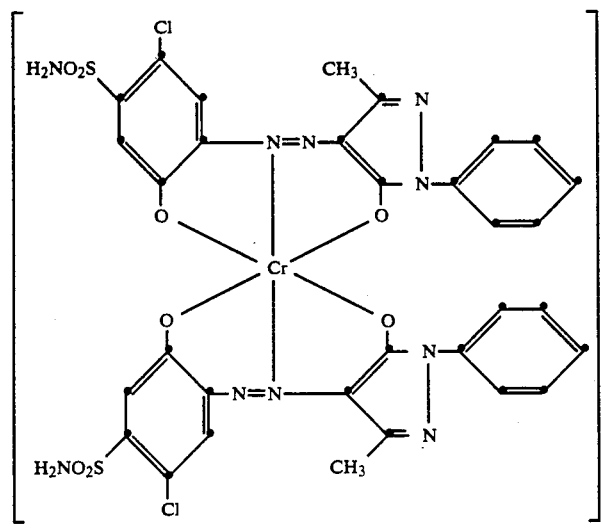

dyes wool in red shades of good fastness properties.

EXAMPLE 4

37 parts of 2-aminophenol-4-N-(β-methoxyethyl)sulfonamide are dissolved in 100 parts of water with 30% sodium hydroxide solution at 30° C. and the solution is clarified by filtration. Then 200 parts of ice and 40 parts of 33% hydrochloric acid are added. The temperature of the solution is about −6° C. Then 37.5 parts of 4N sodium nitrite solution are added to this solution and the reaction mixture is stirred for 30 minutes. This solution of the diazonium salt is added in a fine stream to a solution containing 210 parts of water, 22.2 parts of 2-naphthal, 31 parts of 30% sodium hydroxide solution and 10.7 parts of cobalt sulfate. In the course of this addition the pH is adjusted to c. 9.25 with 30% sodium hydroxide solution and, after addition is complete, the suspension is heated to 75° C. After stirring for c. 1 hour at 75° C., the pH is adjusted to 5.5 with 80% acetic acid and, after 5 minutes, again to 9.25 with 30% sodium hydroxide solution, and stirring is continued for about 75 minutes. The suspension is then diluted with water to a volume of 1500 parts and, after addition of 150 parts of sodium chloride, stirred for 15 minutes and adjusted to pH 7 with 80% acetic acid. The product is isolated by filtration and dried, affording the dye of formula

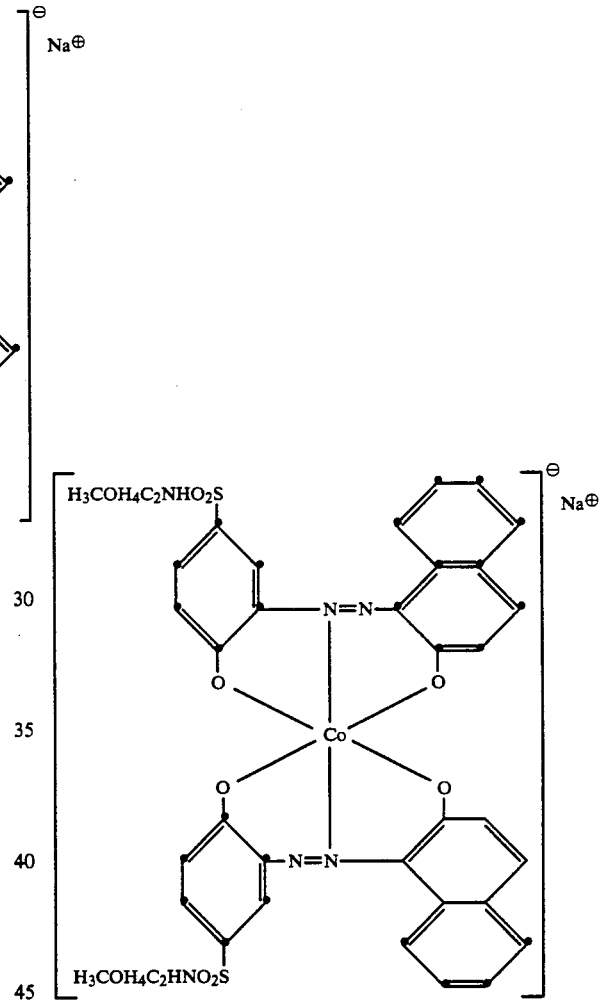

which dyes wool in claret shades of good fastness properties.

EXAMPLE 5

23.4 parts of 2-amino-6-nitrophenol-4-sulfonic acid are added to 100 parts of water and the pH is adjusted to 7.5 with 2N sodium hydroxide solution. Then 22.4 parts of 32% hydrochloric acid and 160 parts of ice are added and, after cooling to 0° C., 28 parts of 4N sodium nitrite solution are added over half an hour while keeping the temperature below 15° C. with 120 parts of ice.

To the solution of the diazonium salt is then added a cold suspension, adjusted to pH 6, of 21.4 parts of 1,3'-chlorophenyl-3-methylpyrazol-5-one, 13.6 parts of crystalline sodium acetate and 2.6 parts of chromium (as 33% basic chromium (III) sulfate powder) over 5 minutes. The pH of the mixture is adjusted to 6 with 2N sodium hydroxide solution and the temperature is slowly raised to 40° C. The reaction mixture is stirred for 1-2 hours at this same pH value and then heated to reflux until the reaction is complete. The dye is salted out with 15% by volume of sodium chloride and 15% by volume of potassium chloride, isolated by filtration and dried. It dyes wool, polyamide, leather, wood and paper in a red shade of good fastness properties.

EXAMPLE 6

15.4 parts of 2-amino-4-nitrophenol are suspended in 40 parts of water and 20 parts of 32% hydrochloric acid are added. After addition of 120 parts of ice, diazotisation is effected with 28 parts of 4N sodium nitrite solution and, finally, 13.6 parts of crystalline sodium acetate are added.

To the diazo suspension is added a solution of
26.7 parts of 1-(4'-sulfonphenyl)-3-methyl-5-pyrazolone,
100 parts of water,
17 parts of 3M FeCl$_3$ solution and
15 parts of tartaric acid,
the pH of which solution has been adjusted to pH 9 with 2N sodium hydroxide solution. After stirring for 2 hours, the temperature is raised to 80° C. and kept for 6 hours. Then 20% by volume of sodium chloride and 5% by volume of potassium chloride are added and the batch is cooled to room temperature. The precipitated product is isolated by filtration and dried, affording a dark powder which dyes polyamide, wool, leather, paper and wood in brown shades of good fastness properties.

EXAMPLE 7

50 parts of water and 150 parts of ice are added to 17.5 parts of 2-amino-4-nitrophenol-6-sulfonic acid. After addition of 17.2 parts of 32% hydrochloric acid, diazotisation is effected with 18.5 parts of 4N sodium nitrite solution.

The diazo solution is added to a reaction mixture comprising
13.9 parts of acetoacetanilide,
11.6 parts of sodium hydroxide solution (30%),
11.0 parts of cobalt sulfate.7H$_2$O.

The pH is kept at 8–10 with 2N sodium hydroxide solution during the addition of the diazo solution and the temperature is permitted to rise to 40° C. After 1 hour, the mixture is heated to 85° C. and the pH is adjusted for ½ hour to 5.5 with 2N hydrochloric acid and then back to 9 with 2N sodium hydroxide solution.

When the reaction is complete, the water is stripped off by rotary evaporation.

The resultant yellow powder dyes wool, polyamide, leather, wood and paper in a yellow shade of good fastness properties.

EXAMPLE 8

92.4 parts of 2-aminophenol-4-(2'-carboxy)sulfanilide are homogenised in 180 parts of water and the temperature is adjusted to 5° C. with ice. Then 47.5 parts of 32% hydrochloric acid are added and diazotisation is effected with 20.7 parts of an aqueous solution of sodium nitrite.

The suspension of the diazonium salt is added to a suspension comprising 66.5 parts of acetoaceto-2'-chloroanilide, 200 parts of water, 40 parts of concentrated sodium hydroxide solution, 22.3 parts of cobalt sulfate and 10 parts of 3-nitrobenzenesulfonic acid, which suspension has been adjusted to pH 8. The pH is then adjusted to 7.5 and the mixture is warmed to 50° C. When the reaction is complete, a yellow dye is obtained in 85% yield, based on the diazo component employed. It dyes wool in a yellow shade of good fastness properties.

EXAMPLE 9

34.6 g of aniline-3-sulfonic acid are diazotised in conventional manner with 50 ml of 4N sodium nitrite solution and aqueous hydrochloric acid. After the dropwise addition of 100 ml of a 1M cobalt sulfate solution, 29.1 g of 8-oxyquinoline, dissolved in hydrochloric acid, are added. The pH is c. 1, and the temperature c. 10° C. The pH is adjusted to 5 with sodium hydroxide solution and the temperature is slowly raised to 40° C. When no further diazonium salt is detectable, the reaction mixture is heated to 80° C. Metallising is complete after about 3 to 6 hours and the water is stripped off by rotary evaporation, affording c. 135 g of a dark powder that dyes leather in a yellowish brown shade.

Further metal complex dyes are obtained by carrying out the procedures described in Examples 1 to 9 using the amines listed in column 2 of the Table, the coupling components listed in column 3, and the metals listed in column 4. Column 5 indicates the shade obtained on wool.

TABLE 1

| Example | Amine | Coupling component | Metal | Shade |
|---|---|---|---|---|
| 1. | HO$_3$S—⟨benzene ring with OH, NH$_2$, NO$_2$⟩ | CH$_3$—C(OH)=CH—C(=O)—NH—⟨benzene ring with Cl⟩ | Co | yellow |
| 2. | HO$_3$S—⟨benzene ring with OH, NH$_2$, NO$_2$⟩ | CH$_3$—C(OH)=CH—C(=O)—NH—⟨benzene ring with Cl⟩ | Fe | yellow |

TABLE 1-continued

| Example | Amine | Coupling component | Metal | Shade |
|---|---|---|---|---|
| 3. | 2-hydroxy-5-sulfo-4-nitroaniline | 1-phenyl-3-methyl-5-pyrazolone | Cr | orange |
| 4. | 2-hydroxy-5-sulfo-4-nitroaniline | 1-(4-chlorophenyl)-3-methyl-5-pyrazolone | Cr | orange |
| 5. | 2-hydroxy-5-sulfo-4-nitroaniline | 1-(3-chlorophenyl)-3-methyl-5-pyrazolone | Co | yellowish brown |
| 6. | 2-hydroxy-5-sulfo-4-nitroaniline | 1-(4-chlorophenyl)-3-methyl-5-pyrazolone | Fe | yellowish brown |
| 7. | 2-hydroxy-3-nitro-5-sulfoaniline | 1-phenyl-3-methyl-5-pyrazolone | Cr | red |
| 8. | 2-hydroxy-3-nitro-5-sulfoaniline | 1-phenyl-3-methyl-5-pyrazolone | Co | orange |
| 9. | 2-hydroxy-3-nitro-5-sulfoaniline | 1-phenyl-3-methyl-5-pyrazolone | Fe | brown |

TABLE 1-continued

| Example | Amine | Coupling component | Metal | Shade |
|---|---|---|---|---|
| 10. | 2-amino-4-nitro-5-hydroxybenzenesulfonic acid (OH, O₂N, NH₂, SO₃H on benzene) | 2-naphthol | Cr | bluish violet |
| 11. | 2-amino-4-nitro-5-hydroxybenzenesulfonic acid | 2-naphthol | Co | reddish violet |
| 12. | 2-amino-4-nitro-5-hydroxybenzenesulfonic acid | 2-naphthol | Fe | brown violet |
| 13. | 2-amino-4-nitro-5-hydroxybenzenesulfonic acid | 1-(2,5-dichlorophenyl)-3-methyl-5-pyrazolone | Co | reddish brown |
| 14. | 2-amino-4-nitro-5-hydroxybenzenesulfonic acid | 1-(2,5-dichlorophenyl)-3-methyl-5-pyrazolone | Cr | red |
| 15. | 2-amino-4-nitro-5-hydroxybenzenesulfonic acid | 1-(2,4-dichlorophenyl)-3-methyl-5-pyrazolone | Cr | red |
| 16. | 2-amino-4-nitro-5-hydroxybenzenesulfonic acid | acetoacetanilide ($CH_3-CO-CH_2-CO-NH-C_6H_5$) | Co | yellow |

TABLE 1-continued

| Example | Amine | Coupling component | Metal | Shade |
|---|---|---|---|---|
| 17. | 2-amino-4-nitro-5-hydroxybenzenesulfonic acid | 1-(2-chlorophenyl)-3-methyl-5-pyrazolone | Cr | red |
| 18. | 2-amino-4-nitro-5-hydroxybenzenesulfonic acid | 1-phenyl-3-methyl-5-pyrazolone | Co | reddish brown |
| 19. | 2-amino-4-nitro-5-hydroxybenzenesulfonic acid | 1-(4-chlorophenyl)-3-methyl-5-pyrazolone | Co | reddish brown |
| 20. | 2-amino-4-nitro-5-hydroxybenzenesulfonic acid | 1-(4-chlorophenyl)-3-methyl-5-pyrazolone | Cr | red |
| 21. | 2-amino-4-nitro-5-hydroxybenzenesulfonic acid | 1-(2-methylphenyl)-3-methyl-5-pyrazolone | Cr | red |
| 22. | 2-amino-4-nitro-6-sulfophenol | 1-phenyl-3-methyl-5-pyrazolone | Co | yellowish brown |
| 23. | 2-amino-4-nitrophenol | 6-hydroxynaphthalene-2-sulfonic acid | Cr | blue |

TABLE 1-continued

| Example | Amine | Coupling component | Metal | Shade |
|---|---|---|---|---|
| 24. | 2-amino-4-nitrophenol | 1-hydroxy-6-sulfonaphthalene | Co | violet |
| 25. | 2-amino-4-nitrophenol | 1-hydroxy-5-sulfonaphthalene | Cr | blue |
| 26. | 2-amino-4-nitrophenol | 6-amino-2-sulfonaphthalene | Cr | grey |
| 27. | 2-amino-4-nitrophenol | 6-amino-2-sulfonaphthalene | Co | grey |
| 28. | 2-amino-3-methyl-5-sulfophenol | 2-hydroxynaphthalene | Cr | violet |
| 29. | 2-amino-3-methyl-5-sulfophenol | 2-hydroxynaphthalene | Co | claret |
| 30. | 2-amino-3-hydroxy-4-sulfonaphthalene | 1-phenyl-3-methyl-5-hydroxypyrazole | Cr | claret |

TABLE 1-continued

| Example | Amine | Coupling component | Metal | Shade |
|---|---|---|---|---|
| 31. | 3-amino-1-hydroxy-naphthalene-6-sulfonic acid | 1-phenyl-3-methyl-pyrazol-5-one derivative (OH, C-N-phenyl, HC, C=N, CH₃) | Co | orange |
| 32. | 2-amino-4-nitro-5-methyl-phenol | 8-hydroxynaphthalene-5-sulfonic acid | Cr | blue |
| 33. | 2-amino-4-nitro-5-methyl-phenol | 8-hydroxynaphthalene-5-sulfonic acid | Co | violet |
| 34. | 2-amino-4-nitro-5-chloro-phenol | 8-hydroxynaphthalene-5-sulfonic acid | Cr | blue |
| 35. | 2-amino-4-nitro-5-chloro-phenol | 8-hydroxynaphthalene-5-sulfonic acid | Co | violet |
| 36. | 2-amino-4-nitro-5-chloro-phenol | 8-hydroxynaphthalene-6-sulfonic acid | Cr | blue |
| 37. | 2-amino-4-nitro-5-chloro-phenol | 8-hydroxynaphthalene-6-sulfonic acid | Co | violet |

TABLE 1-continued

| Example | Amine | Coupling component | Metal | Shade |
|---|---|---|---|---|
| 38. | 2-amino-4-nitro-5-chlorophenol (OH, NH₂, O₂N, Cl on benzene) | 1-hydroxynaphthalene-5-sulfonic acid | Cr | blue |
| 39. | 2-amino-4-nitro-5-chlorophenol | 1-hydroxynaphthalene-5-sulfonic acid (other isomer) | Co | violet |
| 40. | 2-amino-4-nitro-6-sulfophenol (OH, HO₃S, NH₂, NO₂) | 4-(2-methylbutan-2-yl)phenol | Cr | brown |
| 41. | 2-amino-4-nitro-6-sulfophenol | 4-(2-methylbutan-2-yl)phenol | Co | brown |
| 42. | 2-amino-4-nitro-6-sulfophenol | 4-(2-methylbutan-2-yl)phenol | Fe | brown |
| 43. | 2-amino-4-nitrophenol | 1-(4-sulfophenyl)-3-methyl-5-pyrazolone | Cr | orange |

TABLE 1-continued

| Example | Amine | Coupling component | Metal | Shade |
|---|---|---|---|---|
| 44. | 2-amino-4-nitrophenol | 1-(4-sulfophenyl)-3-methyl-5-pyrazolone | Co | yellow |
| 45. | 6-nitro-1-amino-2-naphthol-4-sulfonic acid | 2-naphthol | Cr | black |
| 46. | 6-nitro-1-amino-2-naphthol-4-sulfonic acid | 2-naphthol | Co | corinth |
| 47. | 2-amino-4-nitro-5-sulfophenol | 2-naphthol | Co | claret |
| 48. | 2-amino-4-nitro-6-sulfophenol | 2-naphthol | Cr | grey |
| 49. | anthranilic acid | 1-(4-sulfophenyl)-3-methyl-5-pyrazolone | Cr | yellow |
| 50. | 2-amino-5-sulfobenzoic acid | 1-phenyl-3-methyl-5-pyrazolone | Cr | yellow |

TABLE 1-continued

| Example | Amine | Coupling component | Metal | Shade |
|---|---|---|---|---|
| 51. | 2-amino-4-nitrophenol | 1-hydroxynaphthalene-5-sulfonic acid | Co | violet |
| 52. | 2-amino-4-nitro-6-methylphenol | 1-hydroxynaphthalene-5-sulfonic acid | Cr | blue |
| 53. | 2-amino-4-nitro-6-methylphenol | 1-hydroxynaphthalene-5-sulfonic acid | Co | violet |
| 54. | 2-amino-4-nitro-6-methylphenol | 1-hydroxynaphthalene-3-sulfonic acid | Cr | blue |
| 55. | 2-amino-4-nitro-6-methylphenol | 1-hydroxynaphthalene-3-sulfonic acid | Co | violet |

What is claimed is:

1. A process for the preparation of 1:2 chromium, 1:2 cobalt, 1:2 nickel or 1:2 iron complex azo dye by diazotization, coupling and metalizing without isolation of the coupling product, which process comprises diazotising at least one amine of the benzene or naphthalene series in aqueous solution and coupling diazonium compound so obtained at a temperature in the range of 55° to 85° C. least one coupling component of the benzene or naphthalene series or of the heterocyclic series, such that the azo dye obtained as intermediate contains groups suitable for metal complex formation, and carrying out the diazotization or coupling in the presence of a chromium, cobalt, nickel or iron donor, and wherein the molar ratio of the sum of the amines and the molar ratio of the sum of the coupling components to the metallizing agent is 1.6:1.0 to 2:1.

2. A process according to claim 1, which comprises diazotizing aqueous solution, at least one amine of the benzene or naphthalene series which contains a group suitable for metal complex formation, and coupling the diazonium salt to at least one coupling component of the benzene or naphthalene series or of the heterocyclic series, which coupling component contains a group suitable for metal complex formation, the diazatization or the coupling being carried out in the presence of a chromium, cobalt, nickel or iron donor.

3. A process according to claim 1, wherein diazatization of coupling is carried out in the presence of a chromium, cobalt or nickel donor.

4. A process according to claim 1, wherein the aqueous solution of the coupling component contains the chromium, cobalt, iron or nickel donor.

5. A process according to claim 3, wherein a chromium or cobalt donor is used.

6. The process of claim 1, wherein the coupling temperature is in the range of 70° to 80° C.

7. A process according to claim 1, wherein metalizing is carried out in the temperature range from 40° to 160° C.

8. The process of claim 7, wherein metallizing is carried out in the temperature range of 60° to 160° C.

9. A process according to claim 1, wherein metalizing is carried out under a pressure of 1 to 6 bar.

10. The process of claim 9, wherein metallizing is carried out under a pressure of 2 to 4 bar.

11. A process according to claim 2 for the preparation of a mixed 1:2 metal complex azo dye, which comprises diazotizing at least one amine of formula

  (2)

wherein A is the radical of a diazo component of the benzene or naphthalene series and X is —O— or —COO—, and coupling the diaxonium salt to at least one coupling component of formula

  (3)

wherein B is the radical of a coupling component of the benzene or naphthalene series or of the heterocyclic series, and Y is —O— or —N(R)—, where R is hydrogen, $C_1$-$C_4$alkyl or phenyl, the solution of which coupling component or components contains a chromium, cobalt or iron donor with the proviso that at least two amines of formula (2) or at least two coupling components of formula (3) are used and X is attached to the radical A adjacent to the amino group and Y is attached to the radical B adjacent to the coupling site.

12. The process of claim 11, wherein the solution of coupling component or components contains a chromium or cobalt donor.

13. A process according to claim 2 for the preparation of a symmetrical 1:2 metal complex azo dye of formula

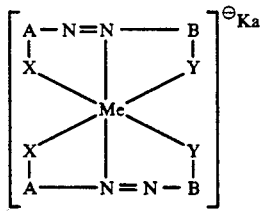  (1)

wherein each A is the identical radical of a diazo component of the benzene or napthalene series, each B is the identical radical of a coupling component of the benzene or naphthalene series or of the heterocyclic series, each X is —O— or—COO—, each Y is —O— or —N(R)—, where R is hydrogen, $C_1$-$C_4$alkyl or phenyl, Me is chromium, cobalt or iron, preferably chromium or cobalt, and Ka is a cation, and X and Y are attached to A and B adjacent to the azo group, which process comprises diazotizing an amine of formula

  (2)

and coupling the diazonium salt to a coupling component of formula

  (3)

the solution of which coupling component contains the chromium, cobalt or iron donor, preferably the chromium or cobalt donor, in which formulae (2) and (3) above A, B, X and Y are as defined for formula (1).

14. A process according to claim 13, which comprises the use of an amine of formula (2), wherein A is a radical of the benzene or naphthalene series which may be substituted by $C_1$-$C_4$alkyl, $C_1$-$C_4$alkoxy, halogen, nitro, sulfamoyl, N—($C_1$-$C_4$alkylsulfamoyl, N—($C_1$-$C_4$)alkoxy-($C_1$-$C_4$)alkylsulfamoyl, phenylsulfamoyl, carboxy-phenylsulfamoyl, $C_1$-$C_4$-alkylsulfonyl, $C_2$-$C_5$alkanoylamino, cyano, trifluoromethyl and sulfo.

15. A process according to claim 13, which comprises using as coupling component of formula (3), or as mixture of two coupling components of formula (3), acetoacetanilide, 1-phenyl-3-methyl-5; -pyrazolone, 1- or 2-naphthylamine, which may be substituted by halogen, $C_1$-$C_4$alkyl, cyano, sulfamoyl, $C_2$-$C_5$alkanoyl-amino, $C_2$-$C_5$alkoxycarbamoyl, $C_1$-$C_4$alkylsulfamoyl, $C_1$-$C_4$alkoxy, sulfo, hydroxy, phenyl or —SO$_2$—CH$_2$—O—.

16. A process according to claim 11, which comprises the use of an amine of formula (2), wherein A is a radical of the benzene or naphthalene series which is unsubstituted or substituted by $C_1$-$C_4$alkyl, $C_1$-$C_4$alkoxy, halogen, nitro, sulfamoyl, N—($C_1$-$C_4$)alkylsulfamoyl, N—($C_1$-$C_4$)alkoxy-($C_1$-$C_4$)alkylsulfamoyl, phenylsulfamoyl, carboxy-phenylsulfamoyl, $C_1$-$C_4$-alkylsulfonyl, $C_2$-$C_5$alkanoylamino, cyano,trifluromethyl and sulfo.

17. A process according to claim 11, which comprises using a coupling component of formula (3), or as mixture of two coupling components of formula (3), acetoacetanilide, 1-phenyl-3-methyl-5-pyrazolone, 1- or 2-naphthol or 2-naphthylamine, which may be substituted by halogen, $C_1$-$C_4$alkyl, cyano, sulfamoyl, $C_2$-$C_5$alkanoyl-amino, $C_2$-$C_5$alkoxycarbamoyl, $C_1$-$C_4$alkylsulfamoyl, $C_1$-$C_4$alkoxy, sulfo, hydroxy, phenyl or —SO$_2$—CH$_2$—O—.

18. A process according to claim 1 for the preparation of a symmetrical 1:2 chromium or 1:2 cobalt complex azo dye, which comprises diazotizing anilinesulfonic acid and coupling the diazo intermediate to 8-hydroxyquinoline, the solution of which coupling component contains a chromium or cobalt donor.

19. A process according to claim 1, wherein the molar ratio of amine to coupling component, or of the sum of all amines to that of all coupling components, is 0.9:1.0 to 1.1:1.0.

* * * * *